United States Patent
Rashford

(10) Patent No.: US 6,863,190 B2
(45) Date of Patent: Mar. 8, 2005

(54) PROTECTIVE ENCLOSURE FOR USE TRANSPORTING ORBITAL REPLACEMENT UNITS (ORUS) WITHIN A SPACE CRAFT

(76) Inventor: Robert Rashford, 10117 Durango Dr., Damascus, MD (US) 20872

( * ) Notice: Subject to any disclaimer, the term of this patent is extended or adjusted under 35 U.S.C. 154(b) by 35 days.

(21) Appl. No.: 10/247,640

(22) Filed: Sep. 20, 2002

(65) Prior Publication Data

US 2003/0141305 A1 Jul. 31, 2003

Related U.S. Application Data

(60) Provisional application No. 60/323,714, filed on Sep. 21, 2001.

(51) Int. Cl.$^7$ ................................................ B65D 6/28
(52) U.S. Cl. ...................................... 220/1.5; 220/612
(58) Field of Search ................................. 220/612, 678, 220/683, 684, 1.5, 4.01, 562, 4.31, 4.32, 833, 810, 676, 913, 4.28

(56) References Cited

U.S. PATENT DOCUMENTS

| 3,706,392 A | * | 12/1972 | Sprick et al. | ............... 220/812 |
| 4,325,488 A | * | 4/1982 | Ketner | ....................... 220/1.5 |
| 5,829,205 A | * | 11/1998 | Clark et al. | .................... 52/67 |

* cited by examiner

Primary Examiner—Stephen Castellano
(74) Attorney, Agent, or Firm—Welsh & Flaxman LLC

(57) ABSTRACT

An enclosure for transporting articles upon a spacecraft. The enclosure includes an external enclosure composed of a plurality of interconnected walls coupled via elongated edge connecting members to define an internal space shaped and dimensioned for receiving an article to be transported upon a spacecraft. The interconnected walls include a first wall selectively coupled to a plurality of sidewalls such that the first wall may be moved to open the internal space defined by the plurality of interconnected walls. The walls are honeycombed aluminum sheets and the edge connecting members are lightweight, high strength members shaped and dimensioned for secure attachment to the walls without the use of mechanical coupling members.

12 Claims, 4 Drawing Sheets

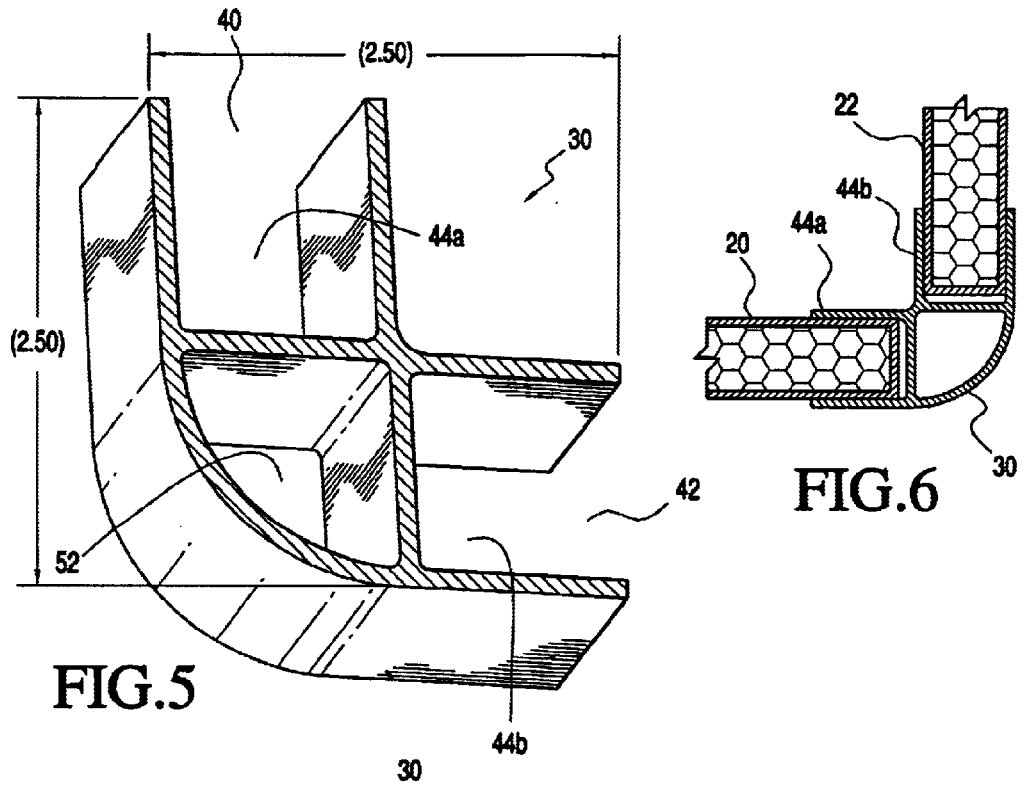
FIG.5
FIG.6
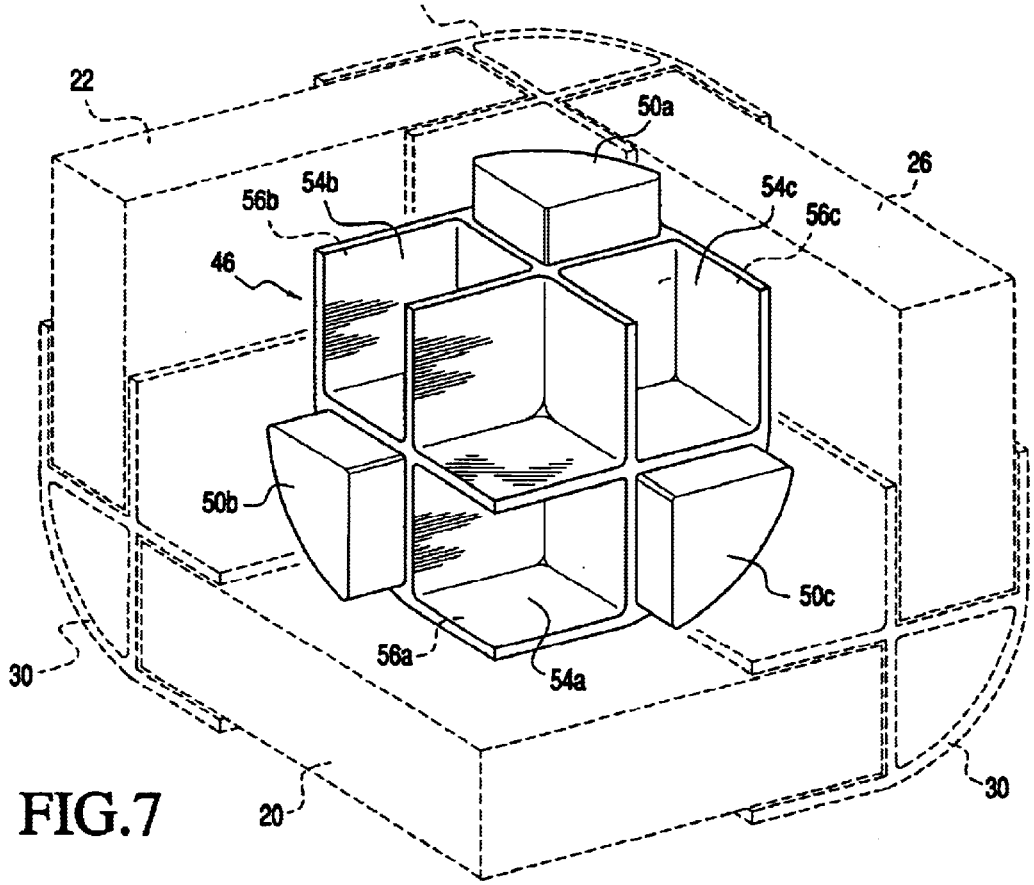
FIG.7

PROTECTIVE ENCLOSURE FOR USE TRANSPORTING ORBITAL REPLACEMENT UNITS (ORUS) WITHIN A SPACE CRAFT

CROSS-REFERENCE TO RELATED APPLICATIONS

This U.S. Patent Application is based upon U.S. Provisional Patent Application Ser. No. 60/323,714, filed Sep. 21, 2001, and entitled "ENCLOSURE FOR USE TRANSPORTING WITHIN A SPACECRAFT".

BACKGROUND OF THE INVENTION

1. Field of the Invention

The invention relates to an enclosure for shipping articles within a spacecraft. More specifically, the invention relates to a lightweight, high strength enclosure including an external enclosure protecting articles stored therein and an internal enclosure supporting the article within the external enclosure.

2. Description of the Prior Art

Advances in space travel have made frequent space expeditions commonplace. Whether these expeditions are for strategic missions or scientific experimentation, the spacecrafts on which these missions are conducted must carry the payload dictated by the requirements of the mission.

In many instances, the payload is expensive, delicate and very valuable to the mission being undertaken. As such, the payload must be protected during transport. However, the space industry places a great priority upon weight and size reduction. Range and payload are adversely affected by conventional terrestrial designs.

In the case of enclosures for articles being shipped into space, the enclosure serves no purpose other than protecting the useful articles stored therein. As such, it would be highly desirable to provide spacecraft enclosures with reduced weight, without sacrificing the strength of the enclosure. The present invention provides such an enclosure.

SUMMARY OF THE INVENTION

It is, therefore, an object of the present invention to provide an enclosure for transporting articles upon a spacecraft. The enclosure includes an external enclosure composed of a plurality of interconnected walls coupled via elongated edge connecting members to define an internal space shaped and dimensioned for receiving an article to be transported upon a spacecraft. The interconnected walls include a first wall selectively coupled to a plurality of sidewalls such that the first wall may be moved to open the internal space defined by the plurality of interconnected walls. The walls are honeycombed aluminum sheets and the edge connecting members are lightweight, high strength members shaped and dimensioned for secure attachment to the walls without the use of mechanical coupling members.

It is also an object of the present invention to provide an enclosure wherein the edge connecting members are aluminum.

It is another object of the present invention to provide an enclosure wherein the edge connecting members are extruded aluminium.

It is a further object of the present invention to provide an enclosure including an internal enclosure shaped and dimensioned to fit within the external enclosure. The internal enclosure is shaped and dimensioned to support an article stored within the external enclosure and is formed of a lightweight, high strength material.

It is still another object of the present invention to provide an enclosure wherein the internal enclosure is a graphite composite.

It is yet a further object of the present invention to provide an enclosure wherein adhesive securely couples the walls to respective edge connecting members.

It is a further object of the present invention to provide an enclosure wherein the walls are approximately 1.04 inches thick.

It is another object of the present invention to provide an enclosure wherein the external enclosure includes a bottom second wall, the bottom wall including a plurality of holes positioned for attaching the enclosure to a support structure.

It is still a further object of the present invention to provide an enclosure wherein the first wall is pivotally secured to the remaining walls for selectively opening and closing the internal space defined by the external enclosure.

It is also a further object of the present invention to provide an enclosure wherein the first wall is provided with a plurality of latches interacting with those walls adjacent to the first wall for securely and selectively locking the first wall in a closed position.

It is also an object of the present invention to provide an enclosure wherein the edge connecting members include a first end and a second end. The first end includes a C-shaped recess dimensioned to receive an edge of a wall and the second end includes a C-shaped recess dimensioned to receive an edge of an adjacent wall.

It is another object of the present invention to provide an enclosure wherein the first end is oriented at approximately 90° relative the second end such that walls respectively secured thereto are perpendicularly orient when fully assembled.

It is a further object of the present invention to provide an enclosure including a plurality of handles secured at predetermined locations on the walls.

It is also another object of the present invention to provide an enclosure wherein the external enclosure includes a plurality of vents formed in the walls.

It is yet a further object of the present invention to provide an enclosure including corner coupling members shaped and dimensioned for attachment to respective ends of the edge connecting members and corners of the respective interconnected walls.

It is another object of the present invention to provide an enclosure wherein the corner coupling members are cast aluminum.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 5 is a cross sectional plan view of the edge connecting member.

FIG. 6 is a cross section view of the edge connecting member with walls secured thereto.

FIG. 7 is perspective view of the corner connecting member.

DESCRIPTION OF THE PREFERRED EMBODIMENT

Figure 1:
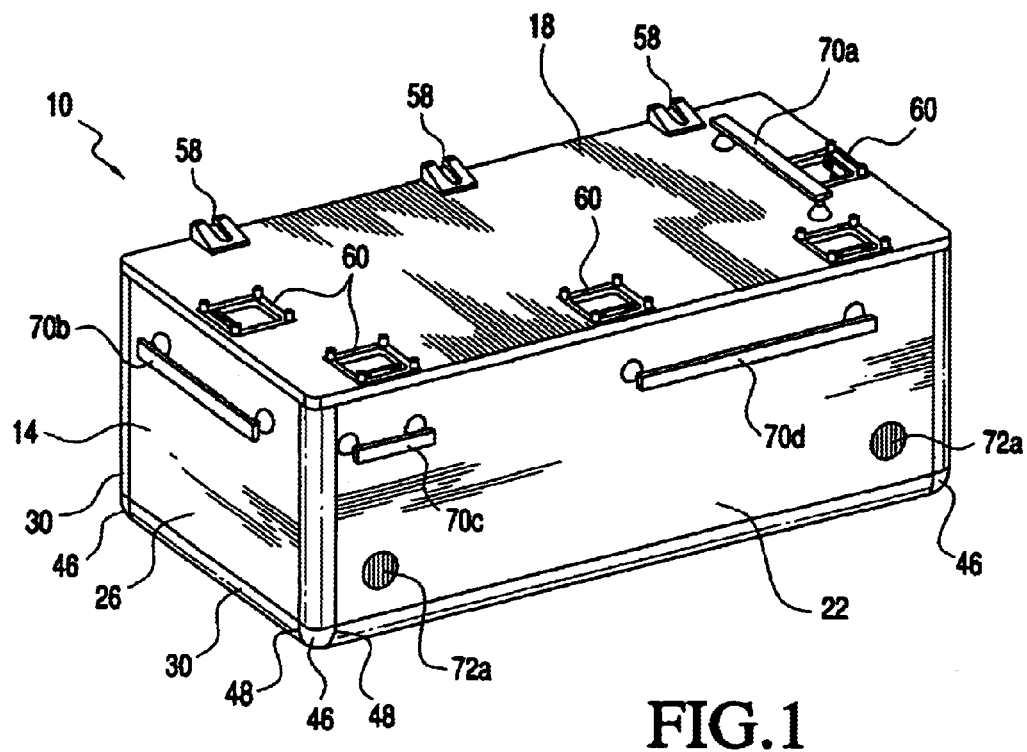
FIG. 1 is a front perspective view of the present enclosure.
Figure 2:
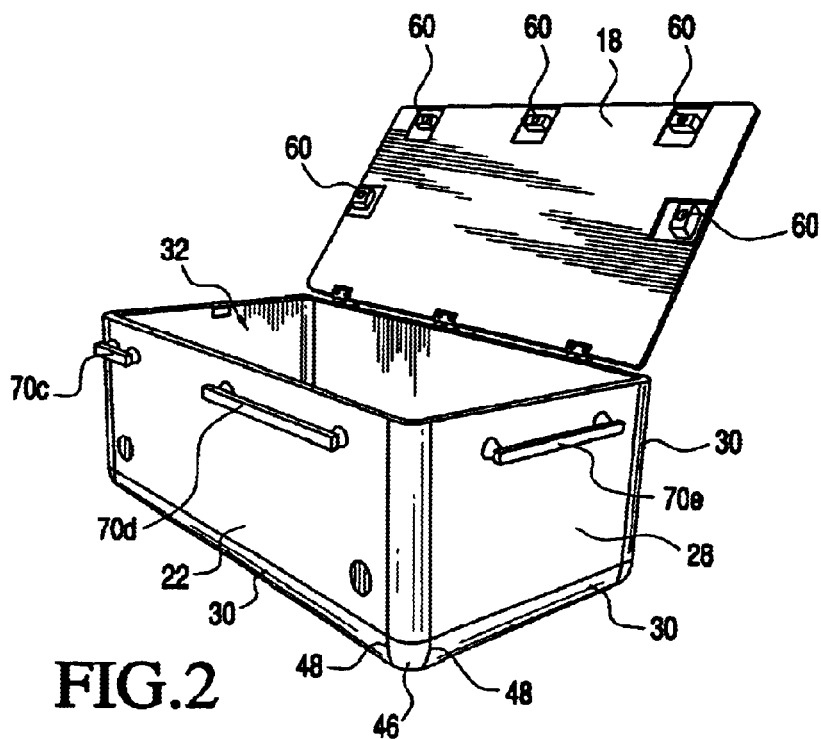
FIG. 2 is a front perspective view of the enclosure with the top wall in an opened position.
Figure 3:
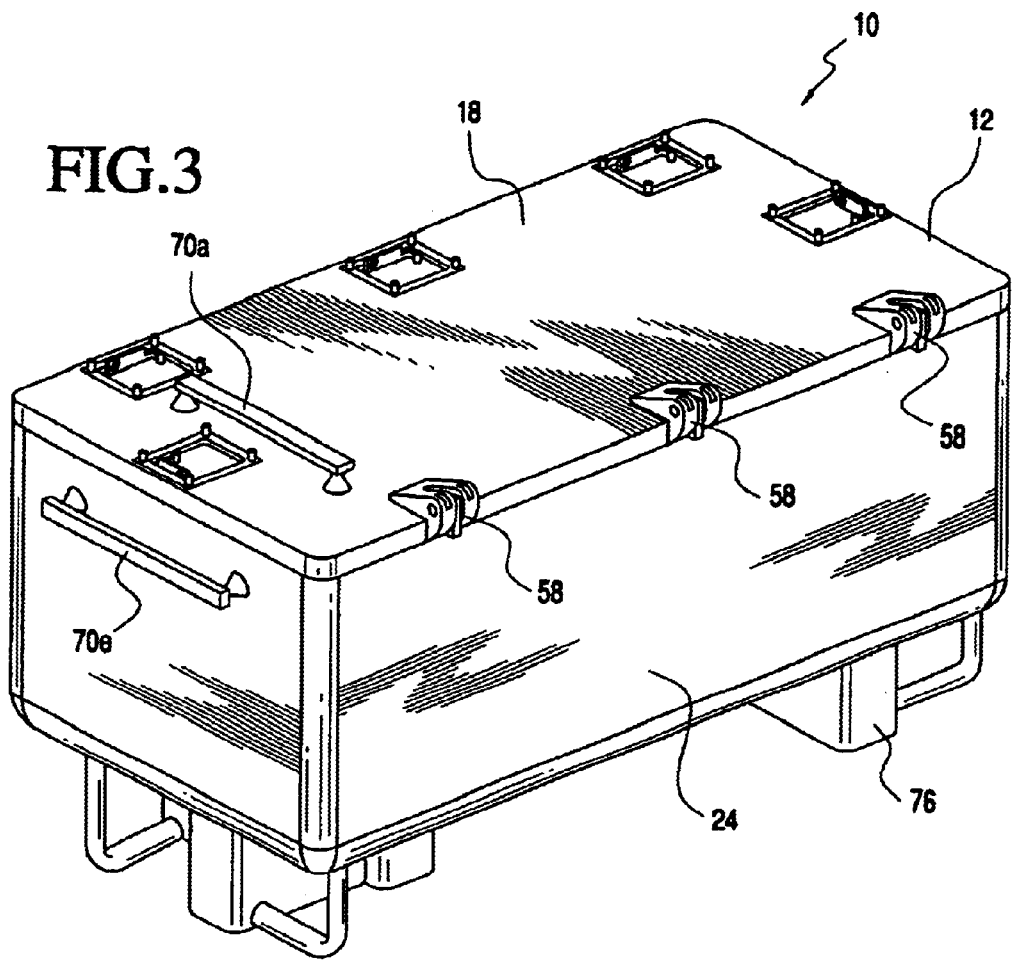
FIG. 3 is a rear perspective view of the present enclosure.
Figure 4:
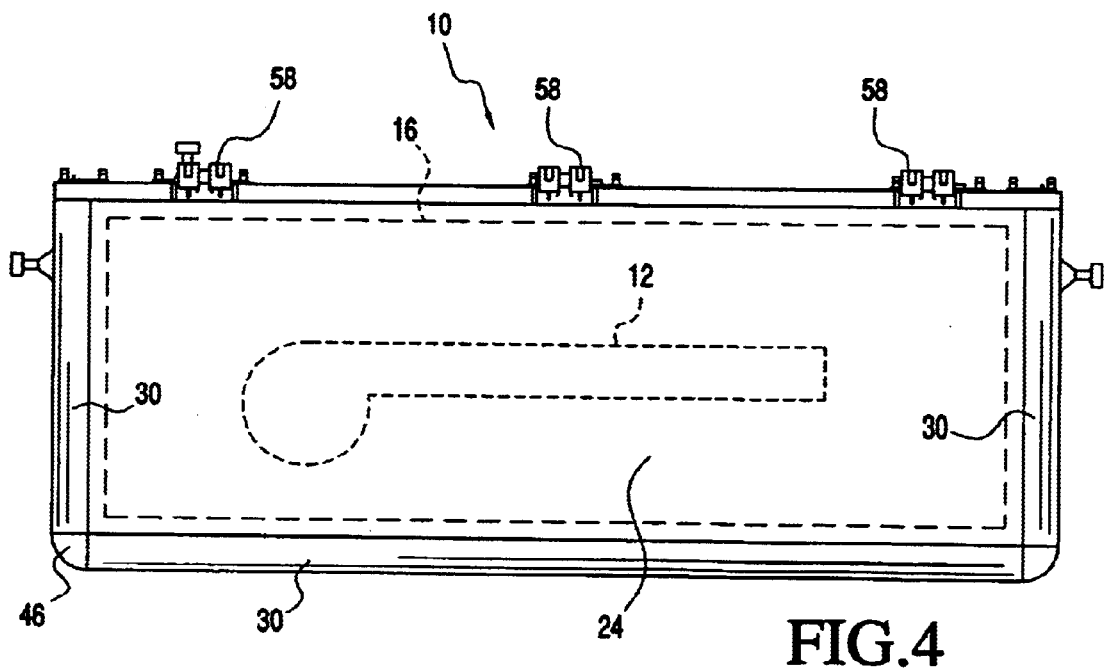
FIG. 4 is a rear plan view with the inner enclosure and articles shown in phantom.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 to 4, an enclosure 10 for transporting articles 12 within a spacecraft is disclosed. The enclosure 10 is particularly adapted for transporting a robotic small fine arm to the International Space Station within the U.S. Space Shuttle. With this in mind, the enclosure 10 must provide strength and rigidity, while simultaneously minimizing weight. This will ensure that the payload survive launch requirements, space environment and landing conditions. The enclosure 10 must further incorporate venting, closures and handles enabling the maneuvering of the enclosure by astronauts under the weightless conditions of outer space.

With this in mind, the enclosure 10 generally includes an external enclosure 14 protecting and supporting the articles 12 stored therein. The enclosure 10 also includes an internal enclosure 16 supporting the article as it sits within the external enclosure 14.

The external enclosure 14 is composed of a plurality of interconnected walls 18, 20, 22, 24, 26, 28 coupled via elongated edge connecting members 30 to define an internal space 32 shaped and dimensioned for receiving an article 12 to be transported upon a spacecraft. More specifically, the external enclosure 14 includes four sidewalls 22, 24, 26, 28, a top wall 18 and a bottom wall 20. The walls 20–28 (with the exception of the top wall 18) are held together by a series of edge connecting members 30 shaped and dimensioned for engaging respective edges of the various walls 20–28 to create a six-sided enclosure 14 in which an article 12 maybe stored and supported. While a six-sided enclosure is disclosed in accordance with a preferred embodiment of the present invention, enclosures of other shapes and dimensions may be constructed without departing from the spirit of the present invention.

As will be discussed below in greater detail, the walls 20–28 and edge connecting members 30 are respectively shaped and dimensioned for secure attachment without the use of mechanical coupling members. The construction offered in accordance with the present invention obviates the need to use mechanical coupling members (for example, rivets, bolts, etc) and thereby reduces weight without sacrificing the overall strength of the enclosure 10.

Figure 9:
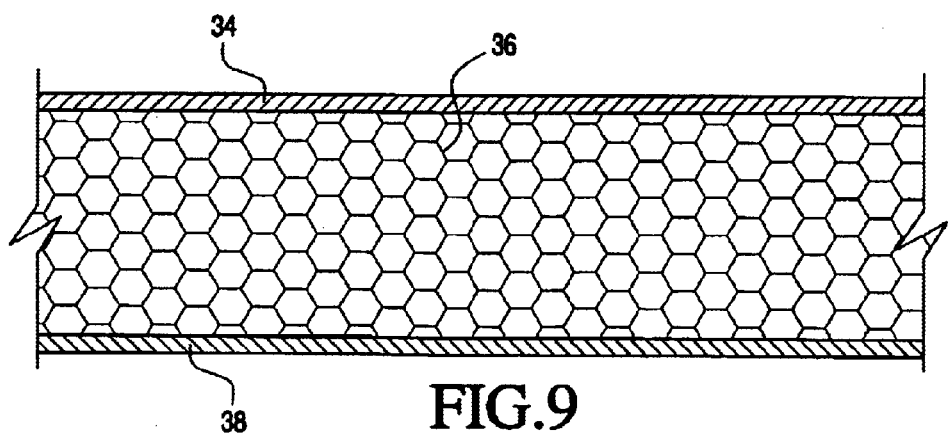
FIG. 9 is a cross sectional view of a wall.

Referring to FIG. 9, a cross section of a wall making up the present enclosure is shown. In accordance with a preferred embodiment of the present invention, the wall is a honeycombed aluminum structure. Specifically, the wall includes an aluminum outer skin 34, an aluminum honeycombed core 36 and an aluminum inner skin 38. The wall thickness is approximately 1.04 inches and the skin thickness is approximately 0.025 inches. The use of a honeycombed structure in accordance with the present invention offers a substantial reduction in weight, while maintaining the strength offered by solid aluminum walls.

As mentioned above, and with reference to FIGS. 5 and 6, the sidewalls 22–28 and bottom wall 20 are securely held together through the use of edge connecting members 30. The edge connecting members 30 are shaped and dimensioned to engage adjacent walls and hold them perpendicular to each other. The edge connecting members 30 are, therefore, elongated members having a first end 40 and a second end 42. The first end 40 and second end 42 are oriented at a 90° angle such that they may support walls at a desired perpendicular orientation.

The first end 40 and second end 42 are shaped and dimensioned to securely receive, support and couple adjacent walls 20–28. Specifically, both the first and second ends 40, 42 are provided with C-shaped recesses 44a, 44b just large enough for the edge of a wall 20–28 to fit therein; that is, the C-shaped recesses 44a, 44b are sized to receive the edge of a wall 20–28 without permitting substantial "play" in the wall 20–28 when positioned within the C-shaped recess 44a, 44b.

Secure bonding of the edge of a wall 20–28 within the C-shaped recess 44a, 44b is ensured by of adhesive bonding of the wall edge within the G-shaped recess 44a, 44b. In accordance with a preferred embodiment of the present invention, the adhesive is HYSOL 9396, manufactured by Loctite Corporation. HYSOL 9396 is a low viscosity, room temperature curing adhesive system with excellent strength properties at temperatures ranging from −67° F. to 350° F.

As shown in FIGS. 5 and 6, the edge connecting member 30 provides a symmetrical construction with dimensions of approximately 2.50 inches by 2.50 inches. The depth of the C-shaped recesses 44a, 44b is approximately 1.150 inches, the thickness of the connecting member walls is approximately 0.100 inches and the width of the C-shaped recesses 44a, 44b is approximately 1.120 inches. In accordance with a preferred embodiment of the present invention, the edge connecting members 30 are extruded aluminum. The construction described above once again provides for reduced weight without sacrificing strength.

Stability of the enclosure 10 is further enhanced by the provision of corner connecting members 46. These corner connecting members 46 are shaped and dimensioned to engage the ends 48 of respective edge connecting members 30 while also engaging the corners of the adjacent walls. Specifically, and with reference to the corner connecting member 46 used to secure the front sidewall 22, the left sidewall 26 and the bottom wall 20, the corner connecting member 46 includes three perpendicularly oriented coupling projections 50a, 50b, 50c. The coupling projections 50a, 50b, 50c are respectively shaped and dimensioned to fit within the central opening 52 of the respective edge connecting members 30 holding the front sidewall 22, the left sidewall 26 and the bottom wall 20 together. In use, the coupling projections 50a, 50b, 50c are fit within the respective central openings 52 and are adhesively bond thereto.

The corner connecting member 46 is also provided with three perpendicularly oriented recesses 54a, 54b, 54c shaped and dimensioned to respectively receive the corners 56a, 56b, 56c of the bottom wall 20, front sidewall 22 and left side wall 26. As with the attachment of the corner connecting member 46 to the edge connecting members 30, adhesive is utilized to securely couple the corners 56a, 56b, 56c of the front sidewall 22, the left sidewall 26 and the bottom wall 20 to the corner connecting member 46.

In accordance with a preferred embodiment of the present invention, the corner connecting members 46 are symmetrical and include a depth of 2.50 inches, a height of 2.50 inches and a width of 2.50 inches. The depth of the recesses 54a, 54b, 54c is approximately 1.150 inches, the thickness of the connecting member walls is approximately 0.100 inches and the width of the recess 54a, 54b, 54c is approximately 1.120 inches. The corner connecting members 46 are further provided with first, second and third projections 55a, 55b, 55c shaped and dimensioned for respective adhesive bonding within the central openings 52 of connecting members 46. In addition, it is preferred that the corner connecting members 46 are cast aluminum.

Access to the contents of the enclosure 10 is facilitated by the top wall 18 which is selectively secured to the remaining walls 20–28 of the external enclosure 14. Specifically, and in accordance with a preferred embodiment of the present invention, the top wall 18 is pivotally 58 secured to the rear sidewall 24 along their adjacent edges. As such, the top wall 18 is not coupled to the remaining walls via the edge connecting members 30 discussed above, but is rather secured thereto via hinges 58 and a series of latches 60.

Figure 8:
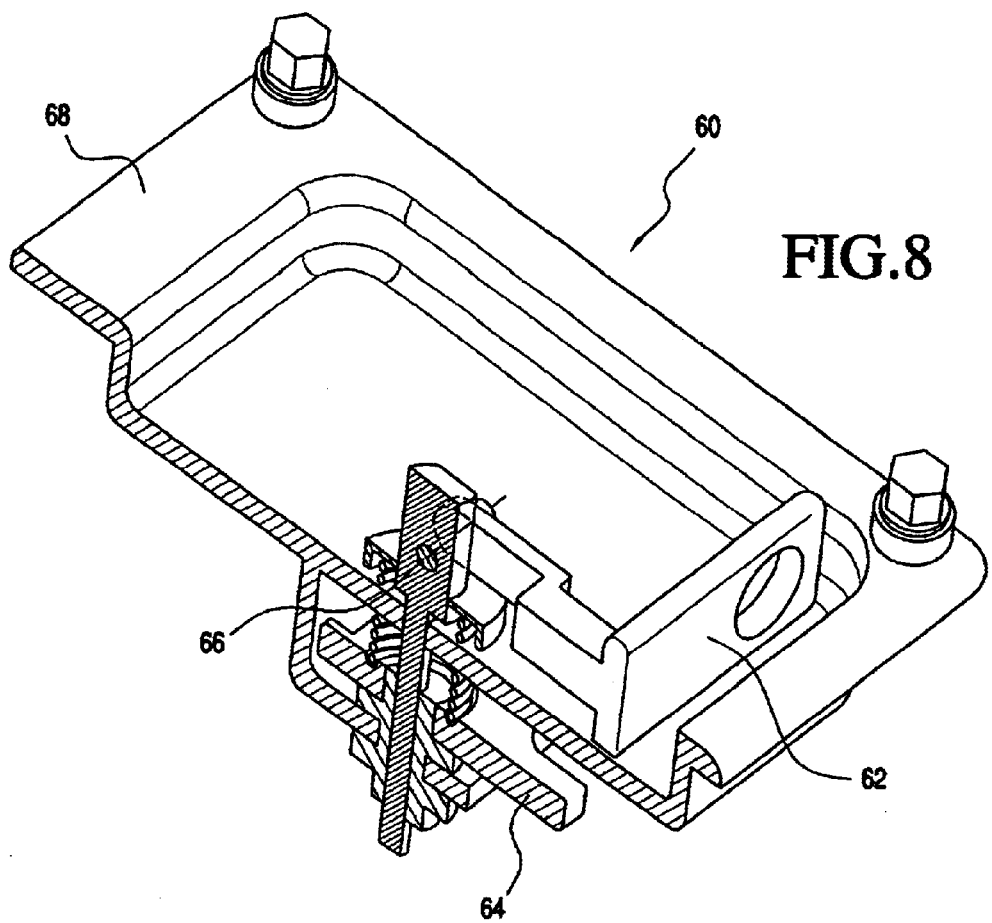
FIG. 8 is cross sectional perspective view of a latch.

With reference to FIG. 8, a latch 60 utilized in accordance with the present invention is disclosed in detail. The latch 60 includes a handle 62 and locking arm 64 coupled via a pivot pin 66 and supported by a latch plate 68. The pivot pin 66 permits operators of the present enclosure to rotate the locking arm 64 between an engaged, locking position and a disengaged, unlocked positioned. Rotation of the handle 62 is controlled by recessing the latch plate 68 such that the handle 62 may only be rotated when the handle 62 is pivoted to a use position where the handle 62 is in line with the pivot pin 66. While a latch is disclosed in accordance with a preferred embodiment of the present invention, other latch mechanisms may be used without departing from the spirit of the present invention.

Maneuvering and use of the present enclosure 10 is further facilitating by securing handles 70a, 70b, 70c, 70d, 70e at various locations along the walls 18–28 of the external enclosure 14. For example, handles are secured to the front sidewall 22, left and right sidewalls 26, 28 and the top wall 18. Use of the external enclosure is further facilitated by the inclusion of various vents 72a, 72b in the front sidewall 22 of the external enclosure 14. The vents 72a, 72b allow for equilibration of pressure and the free flow of air within the external enclosure 14. In addition, the bottom wall 20 is provided with a series of holes 74 positioned for permitting attachment of a standard U.S. Space Shuttle attachment support structure 76 beneath the enclosure 10. As those skilled in the art will certainly appreciate, the position and use of handles, vents and support structures may be readily varied without departing from the spirit of the present invention.

As discussed above, the enclosure is further provided with an internal enclosure 16 shaped and dimensioned to fit within the external enclosure 14. The internal enclosure 16 is shaped and dimensioned to support the article 12 stored within the external enclosure 14 and is formed of a lightweight, high strength material. With this in mind, the internal enclosure 16 is constructed from a graphite composite. As those skilled in the art will appreciate, such an enclosure may be readily shaped to conform to the article being shipped to ensure proper support and protection during transport. Likewise, additional contours can be incorporated to allow bringing back other equipment from space.

The enclosure described above provides spacecraft designers and operators with a convenient, lightweight and high strength enclosure for shipping articles upon a spacecraft. Specifically, the present enclosure has achieved a substantial weight reduction when compared to prior spacecraft shipping enclosures, without sacrificing the strength required for protecting expensive, delicate articles required for space operations.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An enclosure for transporting articles upon a spacecraft, comprising:

an external enclosure composed of a plurality of interconnected walls coupled via elongated edge connecting members composed of extruded aluminum and corner coupling members to define an internal space shaped and dimensioned for receiving an article to be transported upon a spacecraft, the plurality of interconnected walls including a bottom wall wherein the the bottom wall includes a plurality of holes positioned for attaching the enclosure to a support structure;

the corner coupling members are shaped and dimensioned for attachment to respective ends of the edge connecting members and corners of the respective plurality of interconnected walls, the corner coupling members each include a plurality of coupling projections and recesses shaped and dimensioned for selective connection with the plurality of interconnected walls and edge connecting members;

a first wall selectively coupled to the plurality of interconnected walls such that the first wall may be moved to open the internal space defined by the plurality of interconnected walls;

wherein the plurality of interconnected walls and the first wall are honeycombed aluminum sheets and the edge connecting members are lightweight, high strength members shaped and dimensioned, each of the edge connecting member including a first end and a second end, the first end including a C-shaped recess dimensioned to receive an edge of one of the plurality of interconnected walls and the second end including a C-shaped recess dimensioned to receive an edge of an adjacent one of said plurality of interconnected walls, the plurality of interconnected walls and the edge connecting members solely by adhesive being connected.

2. The enclosure according to claim 1, further including an internal enclosure shaped and dimensioned to fit within the external enclosure, the internal enclosure further being shaped and dimensioned to support an article stored within the external enclosure and being formed of a lightweight, high strength material.

3. The enclosure according to claim 2, wherein the internal enclosure is a graphite composite.

4. The enclosure according to claim 1, wherein the plurality of interconnected walls are approximately 1.04 inches thick.

5. The enclosure according to claim 1, wherein the first wall is pivotally secured to the plurality of interconnected walls for selectively opening and closing the internal space defined by the external enclosure.

6. The enclosure according to claim 5, wherein the first wall is provided with a plurality of latches interacting with those plurality of interconnected walls adjacent to the first wall for securely and selectively locking the first wall in a closed position.

7. The enclosure according to claim 1, wherein the first end is oriented at approximately 90° relative the second end such that plurality of interconnected walls respectively secured thereto are perpendicularly orient when fully assembled.

8. The enclosure according to claim 7, wherein the walls are approximately 1.04 inches thick.

9. The enclosure according to claim 1, wherein the external enclosure includes a plurality of handles secured at predetermined locations on the walls.

10. The enclosure according to claim 1, wherein the external enclosure includes a plurality of vents formed in the plurality of interconnected walls.

11. The enclosure according to claim 1, wherein the first wall includes a handle facilitating convenient opening and closing of the external enclosure.

12. The enclosure according to claim 1, wherein the corner coupling members are cast aluminum.

* * * * *